(12) United States Patent
Boatwright

(10) Patent No.: US 10,594,706 B2
(45) Date of Patent: Mar. 17, 2020

(54) SYSTEMS AND METHODS FOR IP SOURCE ADDRESS SPOOF DETECTION

(71) Applicant: Level 3 Communications, LLC, Broomfield, CO (US)

(72) Inventor: Thomas B. Boatwright, Denver, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 71 days.

(21) Appl. No.: 15/468,390

(22) Filed: Mar. 24, 2017

(65) Prior Publication Data

US 2018/0219882 A1    Aug. 2, 2018

Related U.S. Application Data

(60) Provisional application No. 62/451,430, filed on Jan. 27, 2017.

(51) Int. Cl.
*G06F 21/00* (2013.01)
*H04L 29/06* (2006.01)

(52) U.S. Cl.
CPC ...... *H04L 63/1416* (2013.01); *H04L 63/0236* (2013.01); *H04L 63/1458* (2013.01); *H04L 2463/144* (2013.01)

(58) Field of Classification Search
CPC ............. H04L 63/1416; H04L 63/1458; H04L 63/0236; H04L 2463/144
See application file for complete search history.

(56) References Cited

U.S. PATENT DOCUMENTS

| 10,009,358 | B1* | 6/2018 | Xie | H04L 63/14 |
| 2013/0124717 | A1* | 5/2013 | Stevens | H04L 61/20 709/224 |
| 2014/0325596 | A1 | 10/2014 | Edwards et al. | |
| 2015/0350240 | A1* | 12/2015 | Mitchell | H04L 63/1425 726/23 |
| 2016/0071016 | A1 | 3/2016 | Goyal | |
| 2018/0146001 | A1* | 5/2018 | Chien | H04L 63/061 |

OTHER PUBLICATIONS

International Search Report dated Jun. 9, 2017, Int'l Appl. No. PCT/US17/023967, Int'l Filing Date Mar. 24, 2017; 3 pgs.
Written Opinion of the International Searching Authority dated Jun. 9, 2017, Int'l Appl. No. PCT/US17/023967, Int'l Filing Date Mar. 24, 2017; 6 pgs.
International Preliminary Report on Patentability, dated Jul. 30, 2019, Int'l Appl. No. PCT/US17/023967, Int'l Filing Date Mar. 24, 2017; 8 pgs.

* cited by examiner

*Primary Examiner* — Kendall Dolly

(57) ABSTRACT

Aspects of the present disclosure involve systems, methods, computer program products, and the like, for detecting a spoofed source IP address on an incoming communication to any type of network, such as a telecommunications or content delivery network. Each interface to the network may include a classifier that defines or describes source IP addresses that are recognized by the interface as a valid source IP address. If a received communication packet includes a source IP address that is not included or defined by the interface classifier, the packet is considered as a possible spoofed IP address and one or more mitigation techniques may be applied to the incoming packet to prevent an attack on a device or network utilizing the spoofed packet. Such techniques may lessen or prevent an unauthorized access of the device or network or a DDOS attack on the network or device.

18 Claims, 8 Drawing Sheets

SYSTEMS AND METHODS FOR IP SOURCE ADDRESS SPOOF DETECTION

CROSS-REFERENCE TO RELATED APPLICATIONS

This application is related to and claims priority under 35 U.S.C. § 119(e) from U.S. Patent Application No. 62/451,430, filed Jan. 27, 2017, titled "SYSTEMS AND METHODS FOR IP SOURCE ADDRESS SPOOF DETECTION," the entire content of which is incorporated herein by reference for all purposes.

TECHNICAL FIELD

The present disclosure relates to network routing and more specifically to identifying and mitigating a potential spoofing of an Internet Protocol (IP) address of one or more communication packets incoming to a network.

BACKGROUND

Telecommunication or other types of computer networks provide for the transmission of information across some distance through terrestrial, wireless or satellite communication networks. Such communications may involve voice, data or multimedia information, among others. Typically, such networks include several servers or other resources from which the content or network services can be supplied to a requesting end user. To communicate or request content from an element of the network (such as an Internet-based or web-based server), a communication session is typically established between a requesting device and a transmitting device. The communication session may include the exchange of information and/or data included in packets that aid the devices in effective communication. For example, a request to access the network may include an Internet Protocol (IP) address of the device transmitting the request (known as the source IP address), as well as a destination address from which the content may be received. In general, IP addresses are utilized by networks and devices to identify particular destinations and devices of networks around the world.

In some instances, however, the source IP address of a communication packet may be spoofed or otherwise falsified to hide the identity of the sending device. For example, a computing device connected to a network may alter a field in a header attached to or otherwise associated with the communication to include a source IP address that is different than the IP address of the sending device or network. Generally, spoofed IP addresses are utilized by a user to attack one or more devices or networks to gain access to or disrupt service from the one or more devices.

In a first example, an attacker to the network spoofs a source IP address to appear to a receiving device as a known or trusted user. This type of spoofing can be used by network intruders to overcome certain network security measures. For example, many networks have internal systems that trust each other so that users can log into a system without a username or password provided the destination system recognizes and/or trusts the device used to access the system. This is typically done through the accessing device's IP address such that a spoofed IP address allows an attacker to appear as a trusted network or device, thereby gaining illegitimate access to the destination network.

In another example, IP address spoofing is used in distributed denial of service (DDOS) attacks. In a DDOS attack, a target device or network is flooded with requests for data from multiple requesting devices, thereby overwhelming the target. A spoofed IP address aids the attacker in this scenario because the attacker does not care about receiving the requested data and can appear to come from many different source devices to hide the true source of the attack. Also, it is often difficult to determine which traffic to the target is legitimate and which traffic is utilizing a spoofed IP addresses during such an attack. Regardless of the motivations behind the use of a spoofed IP address, such techniques may affect the operation and efficiency of a network or networking devices under attack.

SUMMARY

One implementation of the present disclosure may take the form of a method for detecting an attack on a network device. The method may include the operations of aggregating a plurality of source Internet Protocol (IP) addresses included in a plurality of communications received at an interface device to a network, creating a classifier possibly comprising a decision tree or ensemble of decision trees defining a range of source IP addresses of the received plurality of communications, and receiving a suspect communication comprising a particular source IP address. The method may further include the operations of applying the particular source IP address to the decision tree of the classifier to determine if the particular source IP address is within the range of source IP addresses defined by the classifier and executing a mitigating procedure on the suspect communication when the particular source IP address is not within the range of source IP addresses defined by the classifier.

Another implementation of the present disclosure may take the form of a system for protection of a telecommunications network. The system may include a network data aggregator for aggregating a plurality of source Internet Protocol (IP) addresses included in a plurality of communications received at a network and a classifier creator receiving the plurality of source Internet Protocol (IP) addresses included in a plurality of communications from the network data aggregator and for creating a classifier potentially comprising a decision tree or ensemble of decision trees defining a range of source IP addresses of the received plurality of communications. Further, the system may include a network interface device receiving the classifier from the classifier creator, applying a particular source IP address from a suspect communication to the decision tree of the classifier to determine if the particular source IP address is within the range of source IP addresses defined by the classifier, and executing a mitigating procedure on the suspect communication when the particular source IP address is not within the range of source IP addresses defined by the classifier.

Yet another implementation of the present disclosure may take the form of a non-transitory computer-readable medium encoded with instructions, executable by a processing device, for operating a component of a telecommunications network. When the instructions are executed by the processing device, cause the processing device to aggregate a plurality of source Internet Protocol (IP) addresses included in a plurality of communications received at an interface device to a network, create a classifier potentially comprising a decision tree or ensemble of decision trees defining a range of source IP addresses of the received plurality of communications, and receive a suspect communication comprising a particular source IP address. The instructions also cause the processing device to apply the particular source IP address to the decision tree of the classifier to determine if the particular source IP address is within the range of source IP addresses defined by the classifier and execute a mitigating procedure on the suspect communication when the particular source IP address is not within the range of source IP addresses defined by the classifier.

DETAILED DESCRIPTION

Figure 1A:
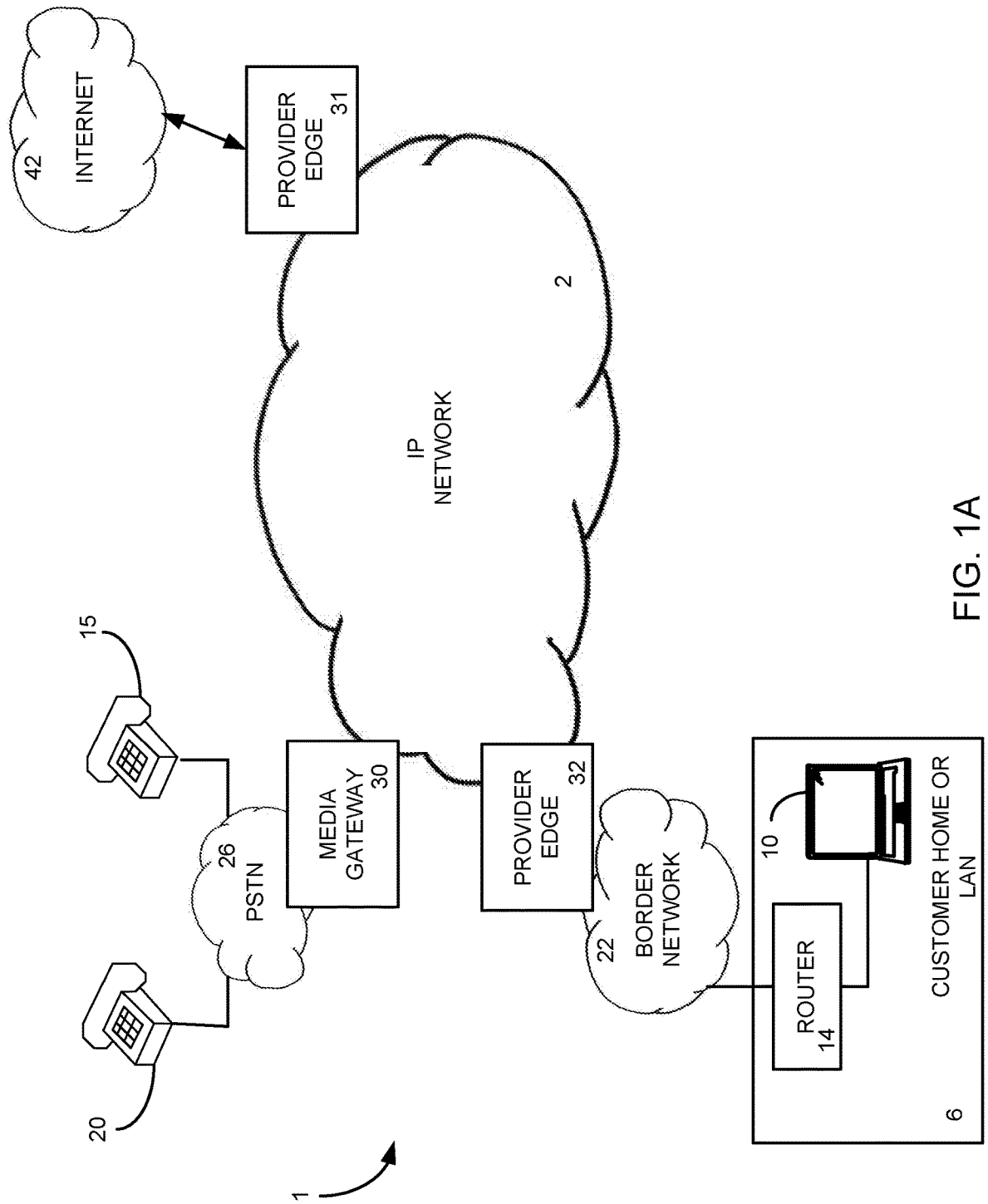
FIG. 1A schematic diagram illustrating an exemplary Internet Protocol (IP) operating environment in accordance with one embodiment

Aspects of the present disclosure involve systems, methods, computer program products, and the like, for detecting a spoofed source IP address on an incoming communication to any type of network, such as a telecommunications or content delivery network. In general, the network includes one or more ingress points to the network, referred to herein as "interfaces". Communication packets entering the network are received first at an interface. The interface may include any networking device that receives packets for a network, such as a router, switch, gateway, etc. Each interface to the network may include a classifier that defines or describes source IP addresses that are recognized by the interface as a valid source IP address. In another embodiment, the metadata on received packets passing through an interface is exported or otherwise transmitted to a central server for analysis. Regardless, each device or network transmitting a communication packet to the interface may include a source IP address that the classifier defines as in communication with the interface. In one particular embodiment, a range of valid source IP addresses may be identifiable through the classifier. If a received communication packet includes a source IP address that is not included or defined by the interface classifier, the packet is considered as a possible spoofed IP address and one or more mitigation techniques may be applied to the incoming packet. For example, the communication may be flagged by the network for further analysis or blocked from entering the network. In another example, the network may provide instructions to another network or device to prevent communications with that spoofed IP address from entering the network.

To create the classifier for each interface, historical traffic data may be provided to and processed by a classifier creator. In particular, the classifier creator receives data on incoming packets to an interface over a set period of time. The set period of time may be for any amount of time as desired by a network administrator. The source IP addresses for each of the incoming packets is utilized to create a decision tree that defines ranges of received IP source addresses at that interface. In one embodiment, a machine learning component of the classifier creator is utilized to create the classifier for the particular interface. As should be appreciated, different interfaces to the network may receive different classifiers from the classifier creator as each interface receives different incoming traffic data. Once a classifier is created for one or more of the interfaces to the network, incoming data packets to a particular interface may be processed through the classifier for that interface. The classifier provides an indication to the network or interface device if the received packet is recognized (included in the decision tree for the interface) or a potentially spoofed source IP address (not included in the range of IP addresses in the decision tree of the classifier). If the incoming source IP address is a potentially spoofed address, the network may apply one or more mitigating techniques to the incoming data packet.

In yet another embodiment, an ensemble of decision trees may be included in the classifier that utilizes many aspects of a received communication. For example, data used to create a classifier at an interface may include the source IP address, a destination IP address, a source communication port, a destination communication port, and/or a communication protocol. One or more decision trees may be created through the obtained information from the received communications at the interface and utilized by the network, either separately or in combination, to identify potentially spoofed IP address of a received communication.

Through the creation and application of the classifier for each interface to the network, potentially spoofed source IP addresses may be detected by the network. Once detected, one or more mitigating techniques may be applied to the spoofed IP address packet to prevent an attack on a device or network utilizing the spoofed packet. Such techniques may lessen or prevent an unauthorized access of the device or network or a DDOS attack on the network or device.

Beginning in FIG. 1A, an exemplary operating environment 1 that may receive a communication with a potentially spoofed source IP address is described. In general, the environment 1 provides for establishing communication sessions between network users and for providing one or more network services to network users. For example, users to the network 1 may communicate with each other through communication devices, including voice communications and video communications. With specific reference to FIG. 1A, the environment 1 includes an IP network 2, which may be provided by a wholesale network service provider. However, while the environment 1 of FIG. 1A shows a configuration using the IP network 2; it should be appreciated that portions of the network may include non IP-based routing. For example, network 2 may include devices utilizing time division multiplexing (TDM) or plain old telephone service (POTS) switching. In general, the network 2 of FIG. 1A may include any communication network devices known or hereafter developed.

The IP network 2 includes numerous components such as, but not limited to gateways, routers, and registrars, which enable communication and/or provides services across the IP network 2, but are not shown or described in detail here because those skilled in the art will readily understand these components. In some instances, those communications may be exchanged across the network 2 over long distances. More relevant to this description is the interaction and communication between the IP network 2 and other entities, such as the one or more customer home or business local area networks (LANs) 6, where a user of the network will connect with the network.

Customer network 6 can include communication devices such as, but not limited to, a personal computer or a telephone 10 connected to a router/firewall 14. Although shown in FIG. 1*a* as computer 10, the communication devices may include any type of communication device that receives a multimedia signal, such as an audio, video or web-based signal, and presents that signal for use by a user of the communication device. The communication and networking components of the customer network 6 enable a user at the customer network to communicate via the IP network 2 to other communication devices, such as another customer network and/or the Internet 42. Components of the customer network 6 are typically home- or business-based, but they can be relocated and may be designed for easy portability. For example, the communication device 10 may be wireless (e.g., cellular) telephone, smart phone, tablet or portable laptop computer. In some embodiments, multiple communication devices in diverse locations that are owned or operated by a particular entity or customer may be connected through the IP network 2.

The customer network 6 typically connects to the IP network 2 via a border network 22, such as one provided by an Internet Service Provider (ISP). The border network 22 is typically provided and maintained by a business or organization such as a local telephone company or cable company. The border network 22 may provide network/communication-related services to their customers. In addition, the communication device 20 accesses, and is accessed by, the IP network 2 via a public switched telephone network (PSTN) 26 operated by a local exchange carrier (LEC). Communication via any of the networks can be wired, wireless, or any combination thereof. Additionally, the border network 22 and PSTN 26 may communicate, in some embodiments, with the IP Network 2 through a media gateway device 30 or provider edge 32, 31. For ease of instruction, only three communication devices 10, 15, 20 are shown communicating with the IP network 2; however, numerous such devices, and other devices, may be connected with the network, which is equipped to handle enormous numbers of simultaneous calls and/or other IP-based communications.

Figure 1B:
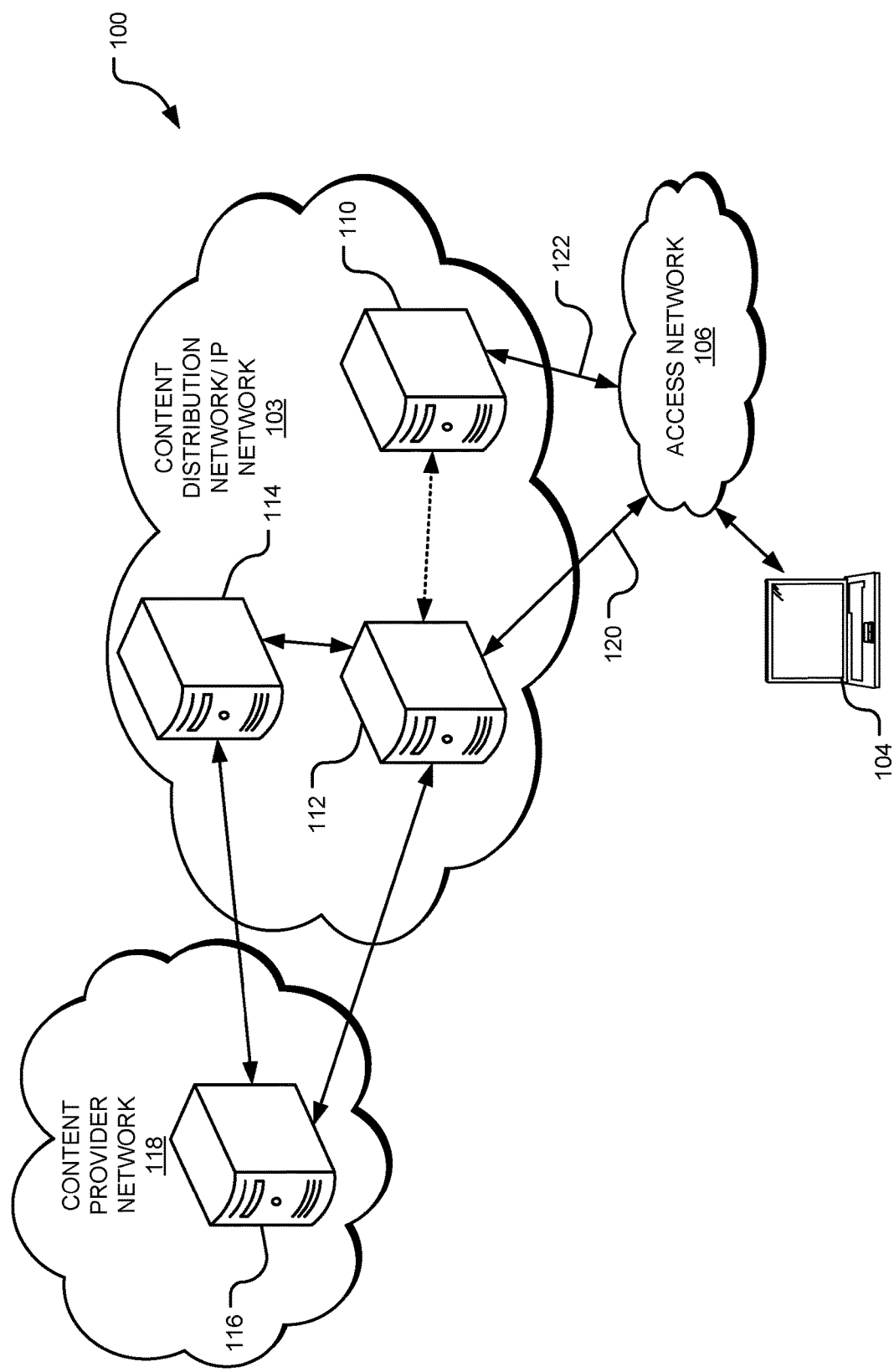
FIG. 1B is an example network environment for receiving a request for content from an end user to a network, such as a content delivery network (CDN).

As mentioned above, the telecommunications network 2 may provide access to the Internet 42 for one or more users of communication devices 10 connected to the network. Thus, in some instances, the telecommunications network 1 may perform the function of an access network to communicate with a web server or other content server hosted by a content delivery network (CDN). In other embodiments, the telecommunications network 1 may host one or more content servers to form a portion of a CDN. FIG. 1B is a CDN environment 100 that may utilize the systems and methods described herein to detect and respond to a spoofed IP address communication packet. Although illustrated in FIG. 1B as a content delivery network, it should be appreciated that aspects of the present disclosure may apply to any type of telecommunications network that utilizes IP addresses for connecting an end user to one or more components of the network. For example, aspects of the disclosure may be utilized to connect a user of the network to an endpoint in the network described above, a conferencing server, a virtual private network device, and the like.

In one implementation of the network environment 100, a CDN 103 is communicably coupled to one or more access networks 106. In general, the CDN 103 comprises one or more components configured to provide content to a user upon a request and an underlying IP network through which the request is received and the content is provided. For example, the one or more content providing components of the CDN may be web servers that provide Internet-based content for browsers requesting information from the Internet. The underlying IP network associated with the CDN servers may be of the form of any type IP-based communication network configured to transmit and receive communications through the network and may include any number and types of telecommunications components. In this manner, CDN-based components may be added to an existing IP-based communication network (such as the telecommunications network 1 described above) so that the components receive a request for content, retrieve the content from a storage device, and provide the content to the requesting device through the supporting IP network. For simplicity, the use of the term "CDN" throughout this disclosure refers to the combination of the one or more content servers and the underlying IP network for processing and transmitting communications, unless otherwise noted.

In one embodiment, a user device 104 connects to the CDN 103 through one or more access networks 106 to request and receive content or content files from the CDN. The access network 106 may be under the control of or operated/maintained by one or more entities, such as, for example, one or more Internet Service Providers (ISPs) that provide access to the CDN 103. Thus, for example, the access network 106 may provide Internet access to a user device 104. In addition, the access network 106 may include several connections to the IP network of the CDN 103. For example, access network 106 includes access point 120 and access point 122, referred to herein as interfaces to the network 103. Also, the user device 104 may be connected to any number of access networks 106 such that access to the CDN 103 may occur through another access network. In general, access to a CDN 103 (or underlying IP network associated with the CDN) may occur through any number of ingress ports to the CDN through any number of access networks. In yet another embodiment, the user device 104 may be a component of the access network 106.

The CDN 103 is capable of providing content to a user device 104, which is generally any form of computing device, such as a personal computer, mobile device, tablet (e.g., iPad), or the like. Content may include, without limitation, videos, multimedia, images, audio files, text, documents, software, and other electronic resources. The user device 104 is configured to request, receive, process, and present content. In one implementation, the user device 104 includes an Internet browser application with which a link (e.g., a hyperlink) to a content item may be selected or otherwise entered, causing a request to be sent to a directory server 110 in the CDN 103. The request for content received from the user device 104 typically includes a source IP address associated with the device. In other embodiments, a source IP address associated with the access network 106 is included in the request. It is this source IP address that provides a potential for spoofing, as described in more detail below with reference to FIG. 2.

The directory server 110 responds to the request by providing a network address (e.g., an IP address) where the content associated with the selected link can be obtained. In one implementation, the directory server 110 provides a domain name system (DNS) service, which resolves an alphanumeric domain name to an IP address. The directory server 110 resolves the link name (e.g., URL or other identifier) to an associated network address from which the user device 104 can retrieve the content. The operation of the directory server 110 and access network 106 to resolve requests for content from the user device 104 is discussed in more detail below with reference to FIG. 2.

In one implementation, the CDN 103 includes an edge server 112, which may cache content from another server to make it available in a more geographically or logically proximate location to the user device 104. The edge server 112 may reduce network loads, optimize utilization of available capacity, lower delivery costs, and/or reduce content download time. The edge server 112 is configured to provide requested content to a requestor, which may be the user device 104 possibly via an intermediate device, for example, in the access network 106. In one implementation, the edge server 112 provides the requested content that is locally stored in cache. In another implementation, the edge server 112 retrieves the requested content from another source, such as a media access server (MAS) (e.g., a content distribution server 114 or a content origin server 116 of a content provider network 118). The content is then served to the user device 104 in response to the requests.

In one implementation, a user of the user computing device 104 enters a link name (e.g., URL or other identifier) into a browser executed on the computing device. The link name is associated with a network address within the CDN 103 at which the content may be obtained and provided to the computing device. For example, the user or the user device may enter a URL such as www.example.com/content into the browser of the computing device 104. Upon entering the URL, the hostname may be extracted by the browser (www.example.com in this particular case) and sends a request (possibly via an operating system running within the computing device 104) to a domain name server (DNS) associated with the user's access network 106.

Figure 2:
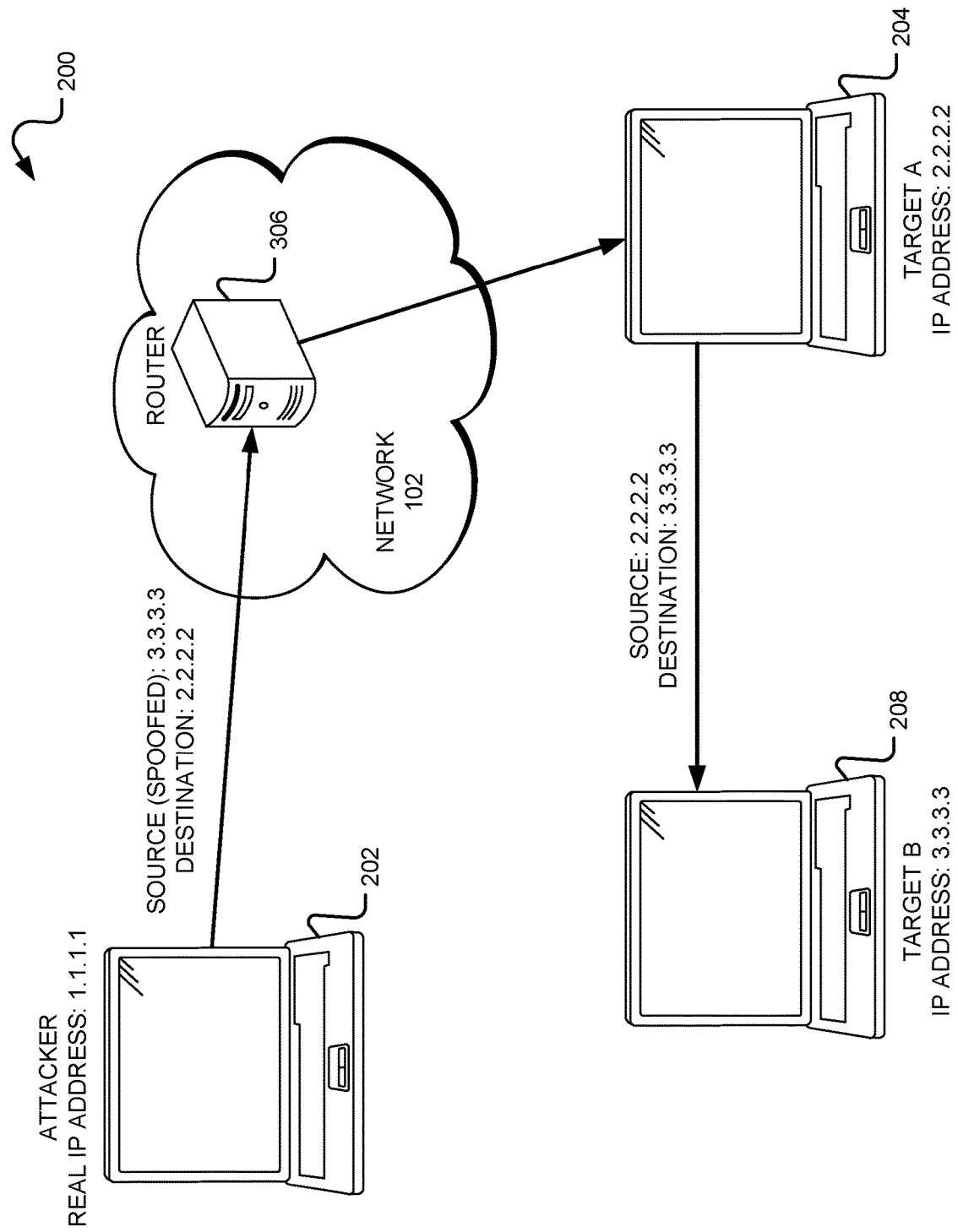
FIG. 2 is a diagram illustrating a method for utilizing a spoofed Internet Protocol (IP) address to attack a network device.

Once a content server is selected, the client device 104 may connect to the selected content server 112 to begin receiving the content. In other words, the client device 104 utilizes the IP address of the content server 112 received from the DNS resolver 110 to establish a communication session with the content server to begin receiving the content. FIG. 2 is a diagram 200 illustrating how an attacker 202 to a device or network may utilize a spoofed Internet Protocol (IP) address to gain access to a target or overwhelm a target while hiding the identity of the attacker.

As shown, an attacker 202 transmits a communication to a router 206 or other routing device of a network 102. The network 102 may be a telecommunications network 1 used to access the Internet or may be a CDN 102 that hosts one or more content servers from which Internet content is requested. In one example, the communication is for content from another device of the network, as described above. Typically, such communications include a header with a source IP address associated with the transmitting device 202 and a destination IP address of a device or network for which the communication is intended. However, this header may be modified by the sending device 202 to spoof a source IP address. In this example, the attacker device 202 has a registered IP address of 1.1.1.1. However, when providing the packet to the network 102, the attacker 202 may spoof the source IP address as 3.3.3.3. The destination IP address (2.2.2.2) defines the device or network under attack through the spoofed source IP address.

Upon receiving the communication, the router 206 of the network 102 routes the communication to the device associated with the destination IP address (2.2.2.2). In this example, the destination device is target A 204 at IP address 2.2.2.2. However, the source IP address included in the communication from the attacker 202 has been altered to another IP address not associated with the attacker device. In this example, the attacker device 202 spoofs the source IP address as 3.3.3.3. This operates to attack either target device A 204 or target device B 208. In particular, the communication sent from the attacking device 202 may be an attempt to gain access to target device A 204. Target device A 204 may be configured to only provide access to trusted devices identified through the source IP address included in the header of the communication. Thus, by spoofing a source IP address of a trusted computer (such as target device B 208 with IP address 3.3.3.3), the attacking device 202 may gain access to the target device A 204 by posing as the trusted computer.

In another example, the communication sent to destination IP address 2.2.2.2 may be a request for content from the destination device 204. Generally, the target device 204 returns the requested content to the source IP address included in the header of the request. Thus, following the spoofed source IP address of 3.3.3.3, the target device 204 provides the requested content to target device B 208, even though target B did not actually request the content. The attacking device 202, in this circumstance, does not intend to receive the requested content. Rather, the attacker 202 may request content be sent to target B 208 to overwhelm target B with unrequested content. In some instances, this may from any number of devices as part of a coordinated attack on target B 208 to disable the target. In a similar manner, the spoofed IP address may be utilized as part of a DDOS attack on target A 204 by flooding the target device with requests for content. However, the attacking device 202 may disguise the source of the attack through the spoofed source IP address to avoid detection. In any circumstance, the use of the spoofed source IP address may negatively affect the performance and efficiency of the network 102 or the targeted devices or networks.

Figure 3:
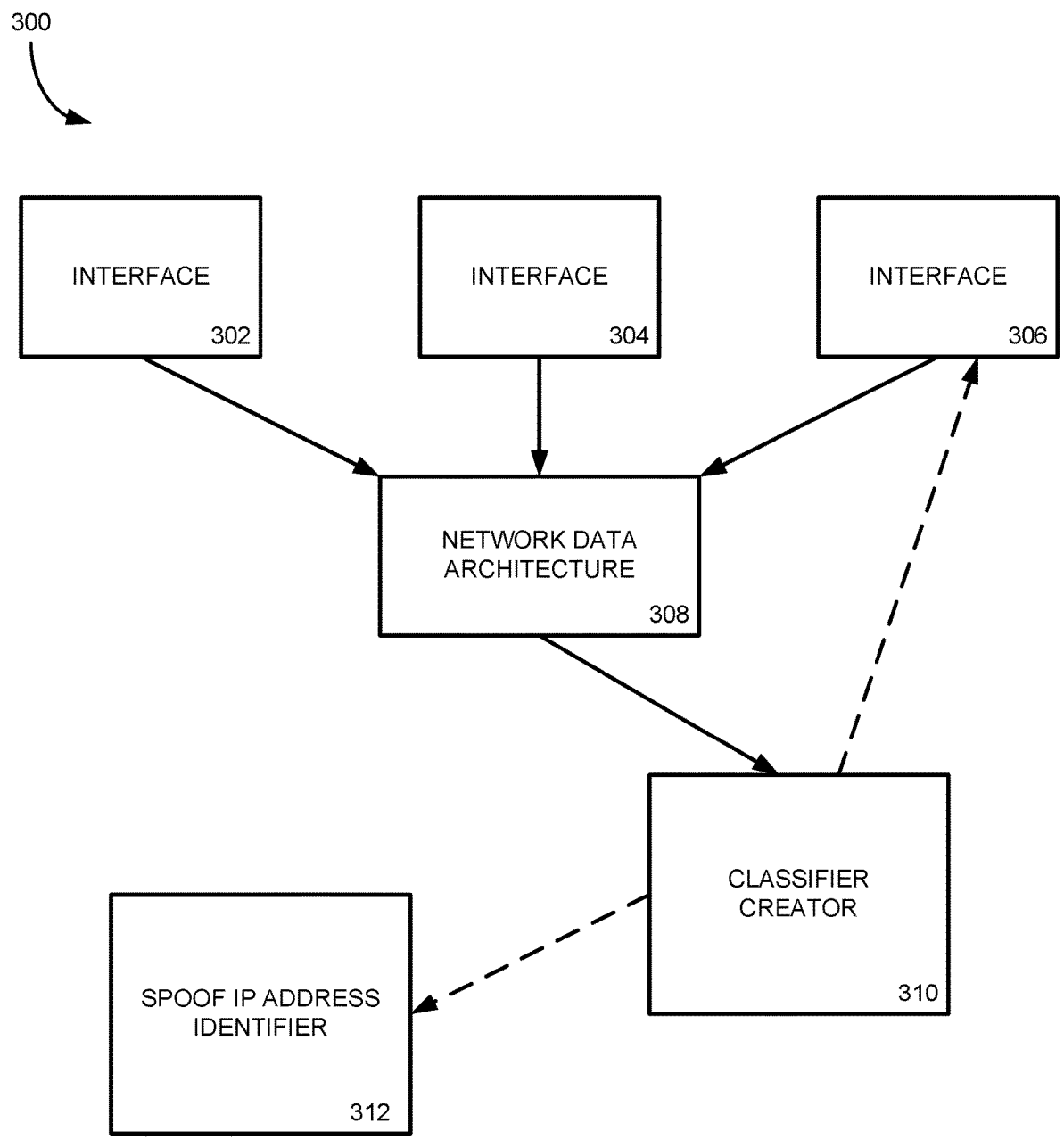
FIG. 3 is an example diagram of a network system for identifying and mitigating a spoofed IP address of a communication packet received at a telecommunications network.

To identify potentially spoofed IP addresses in received communications, a network may include a spoofed IP address identifying system 300 such as that illustrated in FIG. 3. In general, the system 300 may include one or more components of a network or components outside of the network. For example, an application server of a telecommunications network may be utilized as any of the components described below with regard to the system 300. In another example, one or more of the components of the system 300 may be performed by a computing device connected to, but not necessarily a part of, the network. Regardless of the configuration of the components of the system 300, a network may utilize the system to detect a spoofed source IP address of a communication received at the network.

The system 300 of FIG. 3 may include any number of the interfaces 302-306 of a telecommunications network. As described above, the interfaces 302-306 include ingress devices to the network, such as gateways, routers, switches, etc. Each interface 302-206 may provide data on the communication packets received at the interface from external networks or devices to a network data architecture 308. For example, interface 302 may be configured to provide any data of a received communication to the network data architecture 308, including but not limited to, a source IP address, a destination IP address, and other routing information. This data may be continually provided to the network data architecture as communication packets are received at the interfaces 302-306. Further, the network data architecture 308 may store the network traffic data for use by one or more systems of the network, including the classifier creator 310.

Figure 4:
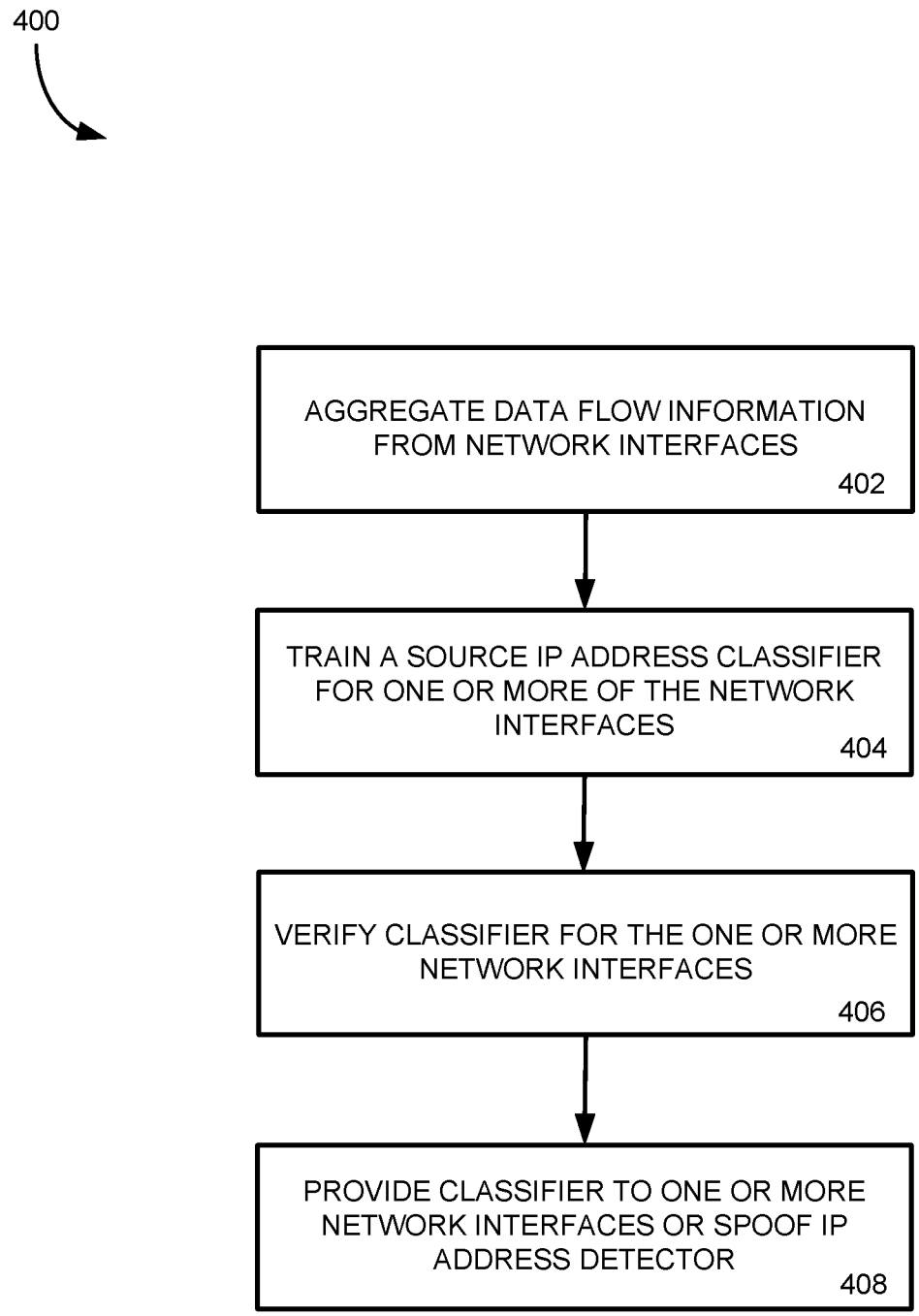
FIG. 4 is a flowchart of a method for training a classifier for an interface to a network to identify a potential spoofed IP address communication packet.

FIG. 4 is a flowchart of a method for training a classifier for an interface to a network to identify a potential spoofed IP address communication packet. As described in more detail below, a classifier is used by a network to determine if a received communication packet includes a spoofed source IP address. One or more of the operations of the method 400 of FIG. 4 may be performed by components of the system 300 illustrated in FIG. 3. However, it should be appreciated that the operations of the method 400 may be performed by any computing device in communication or otherwise associated with the telecommunications network. In one particular embodiment, the operations of the method 400 are performed by the network data architecture 308 and the classifier creator 310 of the system 300 of FIG. 3.

Beginning in operation 402, the network data architecture 308 aggregates network traffic data from one or more interfaces 302-306 of a network. In particular, the network data architecture may aggregate traffic data for a particular interface, such as interface 306, over a period of time. For example, as data packets are received at the interface 306, traffic flow information is provided to the network data architecture 308. The network data architecture 308 may extract certain traffic flow information, such as the source IP address for each received data packet. The source IP address may be collected for any amount of time in past, such as over the previous hour, the previous day, the previous month, etc. The time period over which the source IP address is aggregated for the particular interface 306 may be determine or set by the network or a network administrator as desired.

Figure 5:
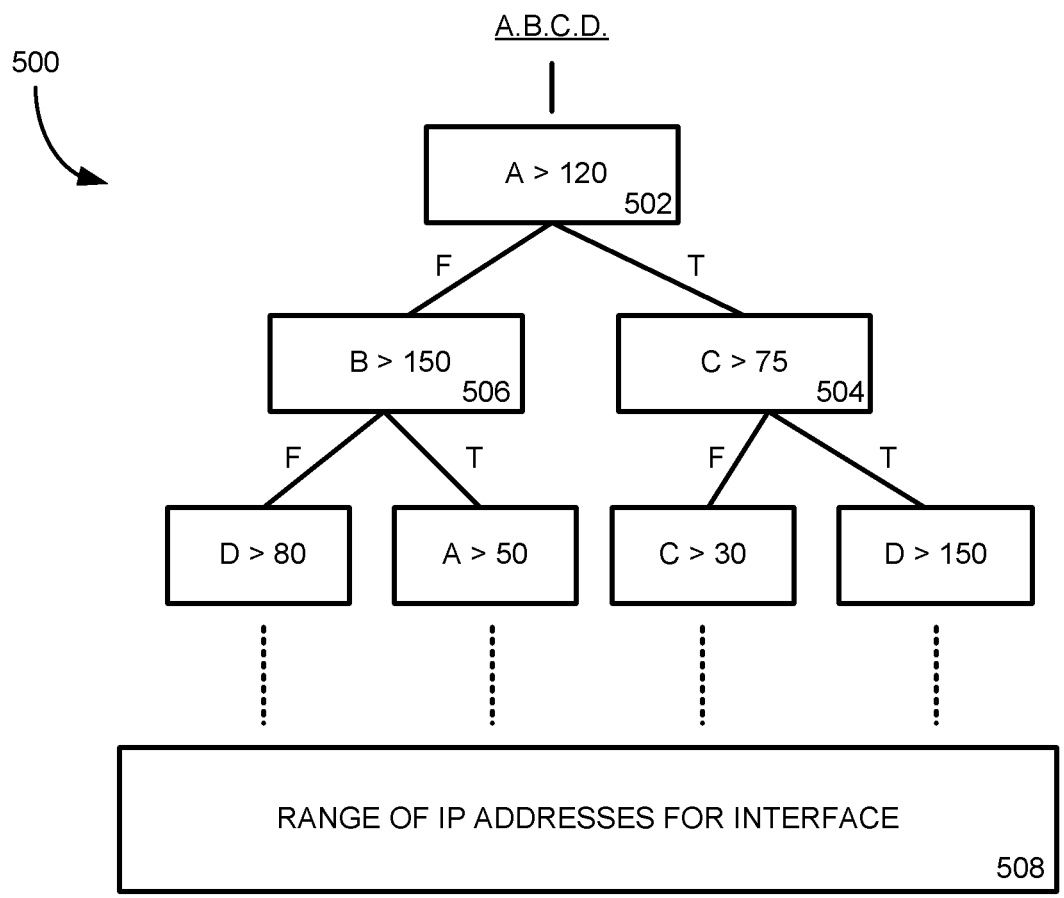
FIG. 5 is a diagram of an example source IP address classifier for an interface to a network.

This traffic data information may be provided to a classifier creator 310 component of the system 300. In operation 404, the classifier creator 310 may utilize the aggregated source IP address information to train and/or create a classifier to identify spoofed IP addresses for the particular interface 306. In one example, the classifier creator 310 analyzes the received source IP addresses for the interface 306 to create a decision tree of ranges that define the received source IP addresses. In general, the design tree of the classifier defines ranges of values of the components of the received source IP addresses at the interface to the network. The particular ranges included in the decision tree may be populated through one or more machine learning techniques to process the aggregated source IP addresses. FIG. 5 is one example of a source IP address classifier for an interface to a network. The classifier 500 may be created through a classifier creator 310 of a network to detect the presence of a spoofed source IP address of a received communication packet at an interface to a network.

As shown in FIG. 5, the classifier 500 includes a decision tree that defines ranges for values within a received source IP address. The ranges included in the decision tree 500 are best described through the application of a received source IP address in a communication packet. For example, the received source IP address may take the form of A.B.C.D, with A, B, C, and D representing a numeric value component of the address. Thus, a source IP address of 100.100.100.100 may be received at an interface to the network, such as value A, B, C, and D equal 100. This received source IP address is applied to a classifier decision tree 500 in the following manner. A first level 502 of the decision tree of the classifier 500 of FIG. 5 is a decision point that determines if a first value (value A in a received source IP address at the interface) is less than 120. If true (represented by "T" in the tree), the decision tree includes a decision point 504 to determine if a third value (value C in the received source IP address) is greater than 75. Alternatively, if value A is less than 120 (represented by "F" in the tree 500), the decision tree includes a decision point 506 to determine if a second value (value B in the received source IP address) is greater than 150. The application of a received source IP address continues through the decision levels of the tree 500 until an end node is met. The result of the application of the received source IP address to the classifier 500 is described in more detail below.

The value ranges included in each decision point or level is created by the classifier creator 310 through an analysis of the received source IP addresses at the particular interface 306. In particular, the classifier creator 310 may determine, through an analysis of the aggregated source IP addresses received at the interface 306, that the first decision point 502 divides the received IP addresses at address vale 120. In other words, decision point 502 divides the received IP addresses into those with an A value less than 120 and those with an A value greater than 120. Other decision points 504, 506 operate in a same manner to further divide the received IP addresses into ranges. Through the ranges included in the decision tree 500, all received source IP addresses received at the interface 306 over the set period of time is defined. Further, because the decision tree 500 includes ranges of values and not just a list of all received source IP addresses, processing of a newly received IP address through the decision tree 500 may take less time than comparing the received IP address to a listing of received IP addresses. In other words, the decision points of the tree 500 operate to collect ranges of received addresses to reduce the processing when a new source IP addresses is encountered.

As mentioned, the classifier for a particular interface 306 to a network defines all of the source IP addresses that have been received at the interface over a period of time. In other words, each of the aggregated source IP addresses received at the interface 306 over the period of time would be included in the range of IP addresses for the interface 508 as determined from the decision tree 500. Consequently, received source IP addresses that are not included in the aggregated source IP addresses for that interface will not pass through the decision tree 500 to be included in the range of received source IP addresses. These non-recognized source IP addresses may be detected or classified as potential spoof source IP addresses.

As described above, a classifier created by the classifier creator 310 may include any metadata of received communications at the network interface. For example, data used to create a classifier at an interface may include the source IP address, a destination IP address, a source communication port, a destination communication port, and/or a communication protocol. One or more decision trees may be created through the obtained information from the received communications at the interface and utilized by the network, either separately or in combination, to identify potentially spoofed IP address of a received communication. Thus, the example provided above in relation to a source IP address is but one example and other classifiers may also be created and utilized.

Returning to the method 400 of FIG. 4, the classifier creator 406 may verify the accuracy of a created classifier in operation 406. The verification of the classifier for the interface 306 may include several methods. In one example, a created classifier may be applied to an interface for a set of time and a percentage of recognized source IP addresses identified by the classifier may be tracked. If the percentage of recognized source IP addresses exceeds 99% (or any percentage value determined by the network or network administrator), the classifier may be determined as valid and applied. A lower percentage of recognized source IP addresses and the classifier may be considered unverified and a new training may occur to create a new classifier. In another example, several classifiers may be created by the classifier creator 310 for a single interface 306. Each of the classifiers may then be applied to the incoming communications to the interface 306 and the classifier with the highest percentage of recognized source IP addresses may be kept as the classifier for that interface, with the other classifiers discarded. In general, any method may be employed to verify the accuracy of a created classifier.

As should be appreciated, the created classifiers for the interfaces to the network provide a definition of the typical source IP addresses that are received at the respective interfaces. This occurs because, in general, the same devices and networks access the network through the same interface to the network. Thus, once an interface receives a source IP address in a communication packet, the interface may assume that more packets will be received with that source IP address at a later time. Thus, the classifier for the interface 306 defines those known source IP addresses associated with the interface such that a received packet with an unknown source IP address may include a spoofed address.

To apply the classifier to incoming packets, the created classifier for a particular interface 306 may be provided to the particular interface or to a spoof IP address identifier 312. In general, the created classifier for any interface may be provided to any component of the network that receives the incoming data or communication packets to the interface. The application of the created classifier to the incoming packets to detect a possibly spoofed source IP address is described below.

Figure 6:
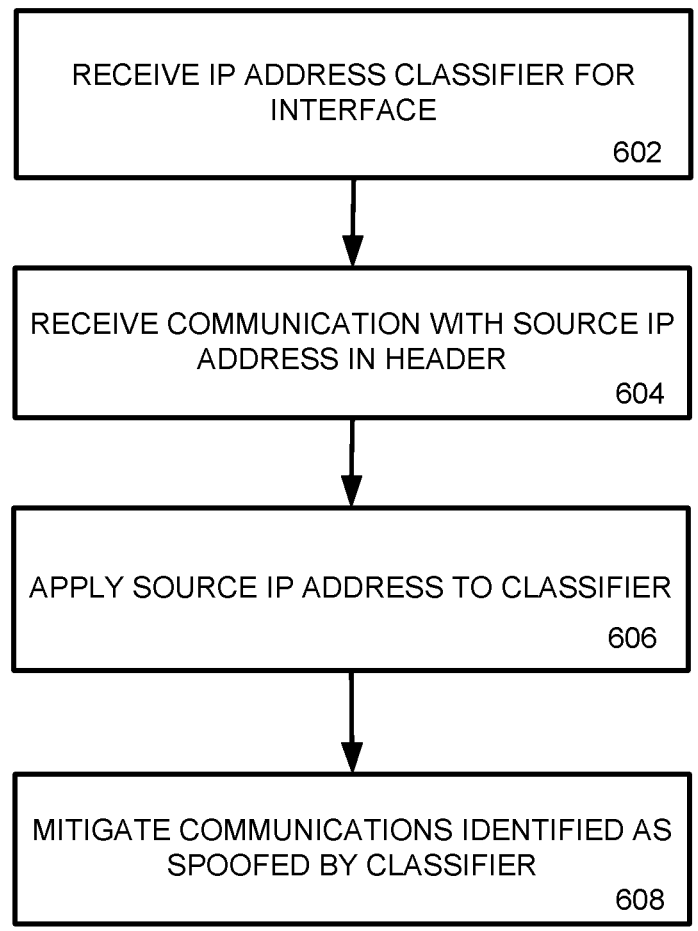
FIG. 6 is a flowchart of a method for applying a spoofed IP address classifier at an interface to a network.

FIG. 6 is a flowchart of a method 600 for applying a spoofed IP address classifier at an interface or other component of a network. In general, the operations of the method 600 may be performed by any component of or related to a network, such as a telecommunications network. In one embodiment, the operations are executed by an interface 306 to the network. In another embodiment, the operations are performed by a spoof IP address identifier system 312 or device. Further, the operations may be performed through the execution of a software program, through one or more circuits or other hardware components of a computing device, or through a combination of software and hardware.

Beginning in operation 602, the interface 306 of the network receives a created classifier from a classifier creator 310. As described above, the classifier defines a range of source IP addresses received at the interface 306 over a period of time. In operation 604, the interface 306 receives an incoming communication packet that includes a source IP address in the header of the packet. The source IP address may be genuinely associated or otherwise assigned to the sending device or network or may be spoofed by the sending device. To determine if the source IP address of the received communication is spoofed, the interface 306 may extract the source IP address from the header and apply the address to the received classifier in operation 606. The application of the extracted source IP address may occur in a similar manner as described above. That is, the source address is applied to the decision tree of the classifier to determine if the address falls within the range of recognized source IP addresses defined by the decision tree. Further, because the decision tree is formed around ranges of values within the address, the application of the source IP address to the decision tree may occur faster than simply comparing the address to a list of received source IP addresses.

The results of the application of the extracted source IP address to the classifier determines if the received communication includes a spoofed source IP address. In particular, if the extracted source IP address is not included in the range of addresses defined by the classifier, the communication may be deemed to include a spoofed source IP address by the interface 306 or system 300. Once identified, the interface 306 or system 300 may execute one or more techniques to mitigate the communication from being transmitted through the network in operation 608. Those communications that include a recognized source IP address as determined by the classifier may be routed to the destination IP address by the network. As such, the method 600 of FIG. 6 provides for the identification and, potentially, mitigation of communication packets that include a spoofed source IP address.

In general, the system 300 may attempt to mitigate or deny the transmission of the packet with the spoofed source IP address in any manner. For example, the interface 306 may forward the identified spoofed packet to a device to prevent further transmission of the packet. The receiving device may also retain the spoofed source IP address for future identification of spoofed communications. In another example, the interface 306 may notify a connected network (such as an ISP) about the spoofed source IP address to alert the network about a potential attacker within the network. In yet another example, the spoofed communication may be transmitted to a honeypot device within the network such that it appears to the attacker as being transmitted to the destination device. By diverting the communication to a honeypot device, the target may avoid the attack on the device. Other known mitigating techniques may also be executed by the interface 306 (or any other component of the network 300) in response to a detection of a spoofed IP address through the application of the classifier. Regardless of the mitigating technique applied, the spoofed IP address communication may be prevented from reaching the destination or target device to prevent an attack on the target through the use of the spoofed IP address.

Figure 7:
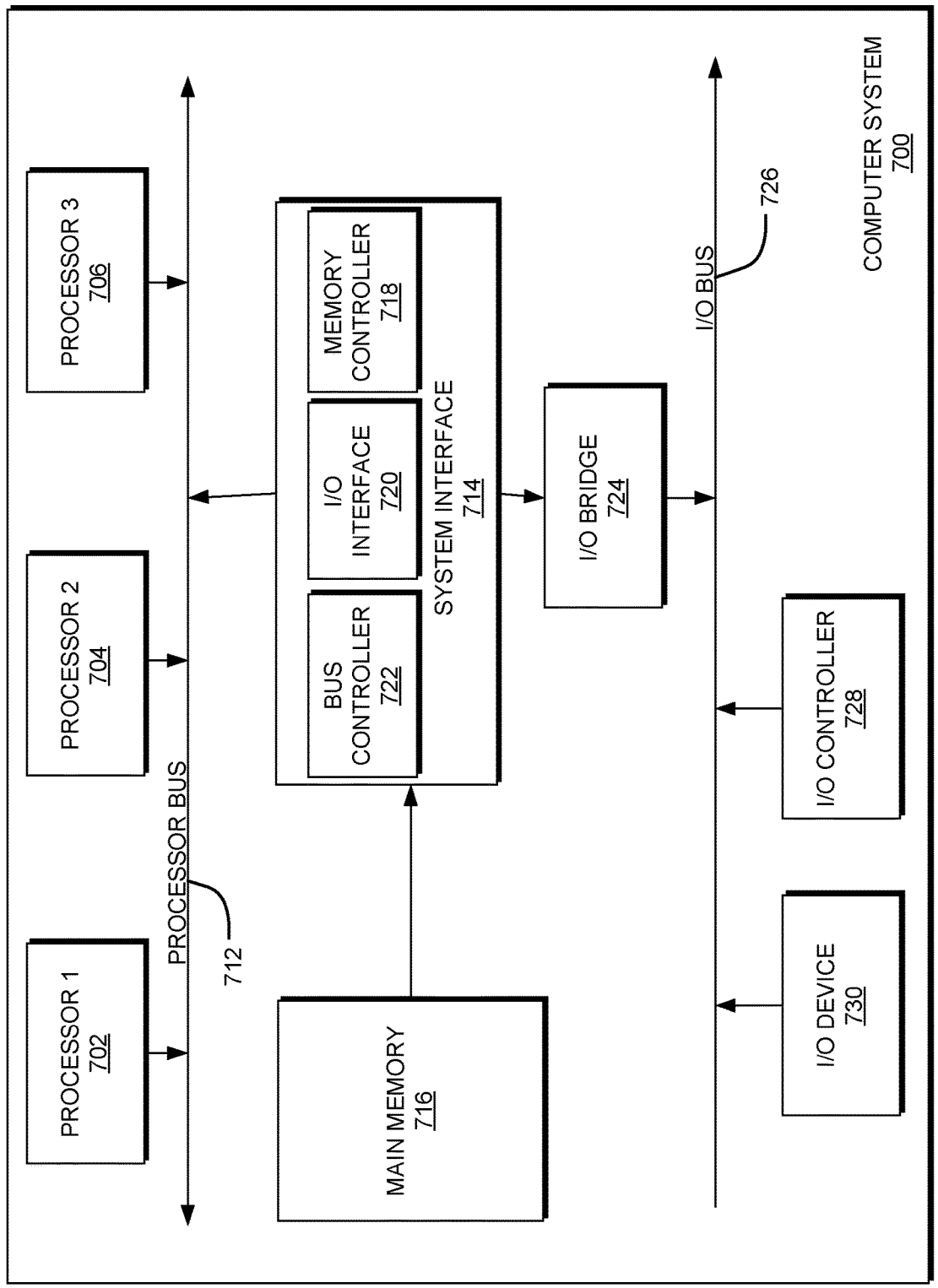
FIG. 7 is a diagram illustrating an example of a computing system which may be used in implementing embodiments of the present disclosure.

FIG. 7 is a block diagram illustrating an example of a computing device or computer system 700 which may be used in implementing the embodiments of the network disclosed above. In particular, the computing device of FIG. 7 is one embodiment of the server or other networking component that performs one of more of the operations described above. The computer system (system) includes one or more processors 702-706. Processors 702-706 may include one or more internal levels of cache (not shown) and a bus controller or bus interface unit to direct interaction with the processor bus 712. Processor bus 712, also known as the host bus or the front side bus, may be used to couple the processors 702-706 with the system interface 714. System interface 714 may be connected to the processor bus 712 to interface other components of the system 700 with the processor bus 712. For example, system interface 714 may include a memory controller 718 for interfacing a main memory 716 with the processor bus 712. The main memory 716 typically includes one or more memory cards and a control circuit (not shown). System interface 714 may also include an input/output (I/O) interface 720 to interface one or more I/O bridges or I/O devices with the processor bus 712. One or more I/O controllers and/or I/O devices may be connected with the I/O bus 726, such as I/O controller 728 and I/O device 730, as illustrated.

I/O device 730 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706. The system set forth in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in main memory 716. These instructions may be read into main memory 716 from another machine-readable medium, such as a storage device. Execution of the sequences of instructions contained in main memory 716 may cause processors 702-706 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 716. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A method for detecting an attack on a network device, the method comprising:
    aggregating a plurality of source Internet Protocol (IP) addresses included in a plurality of communications received at an interface device to a network;
    creating a classifier comprising at least one decision tree defining a range of source IP addresses of the received plurality of communications, wherein the range of source IP addresses identifies which source IP addresses are not suspect;
    verifying the classifier, wherein verifying the classifier comprises:
        applying, to the classifier, a second plurality of source IP addresses from a second plurality of communications;
        calculating a value resulting from applying, to the classifier, the second plurality of source IP addresses from the second plurality of communications to determine whether the second plurality of source IP addresses are within the range of source IP addresses defined by the classifier;
    receiving a communication comprising a particular source IP address;
    applying the particular source IP address to the at least one decision tree of the classifier to determine if the particular source IP address is within the range of source IP addresses defined by the classifier;
    when the particular source IP address is not within the range of source IP addresses defined by the classifier, determining that the communication is a suspect communication; and
    executing a mitigating procedure on the suspect communication.

2. The method of claim 1 wherein the classifier comprises a decision tree structure with a plurality of decision nodes defining a range of values for a sub-portion of the plurality of source IP addresses.

3. The method of claim 1 wherein the plurality of communications are received at the interface device to the network over a set period of time.

4. The method of claim 1 further comprising:
    providing the classifier to the interface device to the network; and
    verifying the classifier at the interface.

5. The method of claim 1 wherein the value is a calculated percentage, and wherein the classifier is verified when the calculated percentage of the second plurality of source IP addresses from the second plurality of communications is above a threshold value.

6. The method of claim 1 wherein the mitigating procedure comprises forwarding the suspect communication to a networking device of the network to prevent further transmission of the suspect communication through the network.

7. The method of claim 1 wherein the mitigating procedure comprises notifying an access network to the network of the suspect communication.

8. The method of claim 1 wherein the classifier is particular to the interface device of the network and the interface device is a gateway device to the network.

9. A system for protection of a telecommunications network, the system comprising:

a memory storing instructions;
a processor in communication with the memory to execute the instructions, wherein the processor executes a network data aggregator and a classifier;
wherein the network data aggregator aggregates a plurality of source Internet Protocol (IP) addresses included in a plurality of communications received at a network;
wherein the classifier creator:
receives the plurality of source Internet Protocol (IP) addresses included in a plurality of communications from the network data aggregator; and
creates a classifier comprising at least one decision tree defining a range of source IP addresses of the received plurality of communications, wherein the range of source IP addresses identifies which source IP addresses are not suspect; and
a network interface device that:
receives the classifier from the classifier creator;
applies a particular source IP address from a suspect communication to the at least one decision tree of the classifier to determine if the particular source IP address is within the range of source IP addresses defined by the classifier;
executes a mitigating procedure on the suspect communication when the particular source IP address is not within the range of source IP addresses defined by the classifier;
verifies the classifier, wherein verifying the classifier causes the network interface device to:
applies, to the classifier, a second plurality of source IP addresses from a second plurality of communications; and
calculates a value resulting from applying, to the classifier, the second plurality of source IP addresses from the second plurality of communications to determine whether the second plurality of source IP addresses are within the range of source IP addresses defined by the classifier.

10. The system of claim 9 wherein the classifier comprises a decision tree structure with a plurality of decision nodes defining a range of values for a sub-portion of the plurality of source IP addresses.

11. The system of claim 9 wherein the plurality of communications are received at the network over a set period of time.

12. The system of claim 9 wherein the classifier is verified when the calculated percentage of the second plurality of source IP addresses from the second plurality of communications is above a threshold value.

13. The system of claim 9 wherein the mitigating procedure comprises forwarding the suspect communication to a networking device of the network to prevent further transmission of the suspect communication through the network.

14. The system of claim 9 wherein the mitigating procedure comprises notifying an access network to the network of the suspect communication.

15. The system of claim 9 wherein the classifier is particular to the network interface device of the network and the network interface device is a gateway device to the network.

16. A non-transitory computer-readable medium encoded with instructions, executable by a processing device, for operating a component of a telecommunications network, the instructions, when executed by the processing device, cause the processing device to perform the operations of:
aggregating a plurality of source Internet Protocol (IP) addresses included in a plurality of communications received at an interface device to a network;
creating a classifier comprising at least one decision tree defining a range of source IP addresses of the received plurality of communications, wherein the range of source IP addresses identifies which source IP address are not suspect;
verifying the classifier, wherein verifying the classifier comprises:
applying, to the classifier, a second plurality of source IP addresses from a second plurality of communications;
calculating a value resulting from applying, to the classifier, the second plurality of source IP addresses from the second plurality of communications to determine whether the second plurality of source IP addresses are within the range of source IP addresses defined by the classifier;
receiving a communication comprising a particular source IP address;
applying the particular source IP address to the at least one decision tree of the classifier to determine if the particular source IP address is within the range of source IP addresses defined by the classifier;
when the particular source IP address is not within the range of source IP addresses defined by the classifier, determining that the communication is a suspect communication; and
executing a mitigating procedure on the suspect communication.

17. The non-transitory computer-readable medium of claim 16 wherein the classifier comprises a decision tree structure with a plurality of decision nodes defining a range of values for a sub-portion of the plurality of source IP addresses.

18. The non-transitory computer-readable medium of claim 16 wherein the mitigating procedure comprises forwarding the suspect communication to a networking device of the network to prevent further transmission of the suspect communication through the network.

* * * * *